United States Patent
Subrahmanyam et al.

(10) Patent No.: US 6,445,388 B1
(45) Date of Patent: Sep. 3, 2002

(54) TOLERANT PERSISTENT NAMING FOR LOFT FEATURES IN A PARAMETRIC FEATURE-BASED, SOLID MODELING SYSTEM

(75) Inventors: Somashekar Ramachandran Subrahmanyam, Farmington Hills; Mahabaduge Janaka Kithsiri Jayasuriya, Brighton, both of MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/358,671

(22) Filed: Jul. 22, 1999

(51) Int. Cl.[7] .............................................. G06T 17/00
(52) U.S. Cl. ..................................................... 345/420
(58) Field of Search ................................. 345/420, 619

(56) References Cited

U.S. PATENT DOCUMENTS 5,861,889 A * 1/1999 Wallace et al. ............. 345/433

OTHER PUBLICATIONS

Hughes, PL/I Programming, 1973.*
Vasilis Capoyleas, et al., "Generic Naming in Generative, Constraint–based Design", Computer–Aided Design, vol. 28, No. 1, 1996, pp. 17–26.
Xiangping Chen, et al., "On Editability of Feature–Based Design", Department of Computer Science, Purdue University, Report CSD–TR–94–067, Nov. 1994, pp. 1–23.
Jiri Kripac, "A Mechanism for Persistently Naming Topological Entities in History–based Parametric Solid Models", Computer–Aided Design, vol. 29, No. 2, 1997, pp. 113–122.

* cited by examiner

Primary Examiner—Mark Zimmerman
Assistant Examiner—Lance W. Sealey
(74) Attorney, Agent, or Firm—Gates & Cooper LLP

(57) ABSTRACT

A computer-implemented, parametric feature-based, solid modeling system which generates tolerant, persistent and unique names for topological entities of a loft feature. The system uses similarity analysis to preserve and update the names, so that they are tolerant to partial topology changes in the loft feature.

51 Claims, 10 Drawing Sheets

TOLERANT PERSISTENT NAMING FOR LOFT FEATURES IN A PARAMETRIC FEATURE-BASED, SOLID MODELING SYSTEM

BACKGROUND OF THE INVENTION

1. Field of the Invention

The present invention relates generally to computer-assisted drafting (CAD) systems, and in particular, to a method, apparatus, and article of manufacture for tolerant, persistent naming of loft features in a parametric feature-based, solid modeling system.

2. Description of the Related Art

Over the last decade, designers have changed their fundamental approach to CAD systems, moving from 2D drawing systems to 3D solid modeling systems. New software makes solid modeling technology available and affordable to virtually anyone.

Solid modeling is a technique that allows designers to create dimensionally accurate 3D solid models in 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, and chamfers. The geometry of the parametric feature-based model is defined by underlying mathematical relationships (i.e., parameters) rather than by simple unrelated dimensions, which makes them easier to modify. These systems preserve design intent and try to maintain it after every change to the model.

Moreover, these features are automatically adjusted as the model is modified. The system computes any related changes to parts of the model that are dependent on a parameter, and automatically updates the entire model when the parameter is changed. For example, a through-hole will always go completely through a specified part, even if the part's dimensions are changed.

Lofting is a useful technique for generating complex shapes in feature-based parametric solid modeling systems. Typically, the user provides the system with input in the form of a number of 2D cross-sections, in a specific order, along with parameters such as tangency conditions, take-off angles, and weight factors. The system then processes this input into a loft feature of the 3D solid model.

The use of a loft feature within a parametric modeling system requires the capabilities of persistently naming topology produced by the loft feature. These names normally exist on the topological entities (faces, edges, vertices) of the loft feature. One of the desirable traits of such names is that they be invariant (or tolerant) to changes made in the defining geometry of the loft.

Most prior art systems do not generate and maintain unique persistent names that are tolerant to change in the defining data of a loft feature. In such prior art systems, downstream features referencing the loft feature will fail to update during editing operations involving partial or drastic topology changes.

Consider, for example, the following publications:

Kripac, J., "A mechanism for persistently naming topological entities in history-based parametric solid models", Computer-Aided Design, Vol. 29(2): pp. 113–122, 1997;

Hoffman, C. M., Capoyleas, V., Chen, X., "Generic Naming in Generative, Constraint-Based Design", Computer-Aided Design, Vol. 28, pp. 17–26, 1996;

all of which are incorporated by reference herein.

The prior art systems described in the above publications expend no effort to look at the previous state of the loft feature during editing operations to preserve the names on the topological entities of the updated feature. The previous state of the loft feature contains important information, which the current invention uses to achieve unique and persistent names that are tolerant to partial topology changes.

Tolerant naming would allow other designs features (e.g., downstream features) in the model to establish and resolve dependencies to the loft feature, notwithstanding topological changes to the loft feature, such as adding/deleting other feature, changing the order of cross-sections in the loft feature, adding/deleting one or more cross-sections in the loft feature, etc. Thus, there is a need in the art for unique persistent naming of loft feature that are tolerant in a parametric feature-based solid modeling system.

SUMMARY OF THE INVENTION

To address the requirements described above, the present invention discloses a computer-implemented, parametric feature-based, solid modeling system that generates tolerant and unique persistent names for the topological entities of a loft feature. The system preserves and updates the names using a similarity analysis, so that they are tolerant to partial topology changes in the loft feature and any model containing the loft feature.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Overview

The present invention is a computer-implemented, parametric feature-based, solid modeling system that generates tolerant and unique persistent names for topological entities of a loft feature. The system provides a tolerant approach that attempts to preserve and update the names in response to partial topology changes in the loft feature. Thus, the present invention makes parametric feature-based solid modeling systems more acceptable to users.

One advantage of the present invention is that it allows full editing of a loft feature and yet attempts to preserve persistent names, notwithstanding any editing changes. Another advantage is that downstream design features that reference the loft feature will update successfully, as some persistent names are preserved from one editing operation to the other.

Hardware and Software Environment

Figure 1:
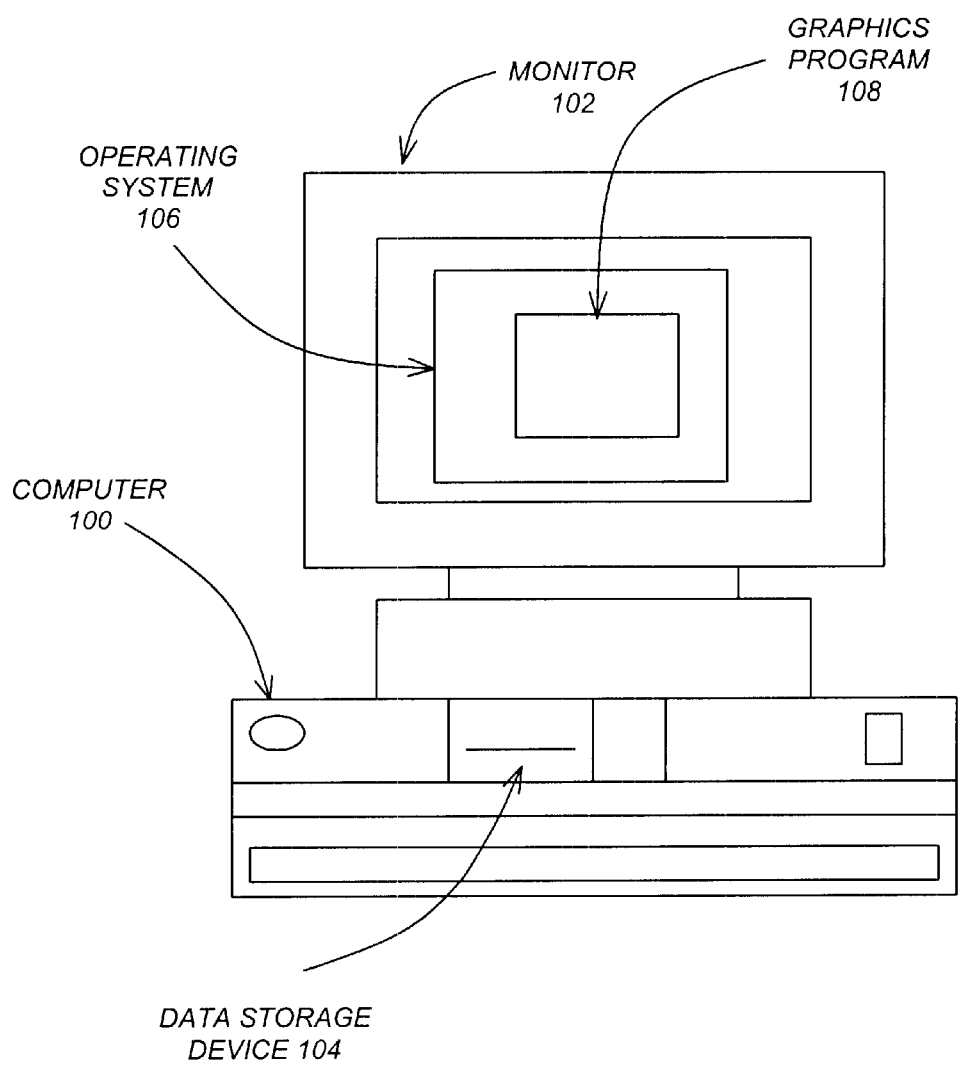
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108 that operates under the control of the operating system 106, wherein the graphics program 108 also is represented by a window displayed on the monitor 102.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via a data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
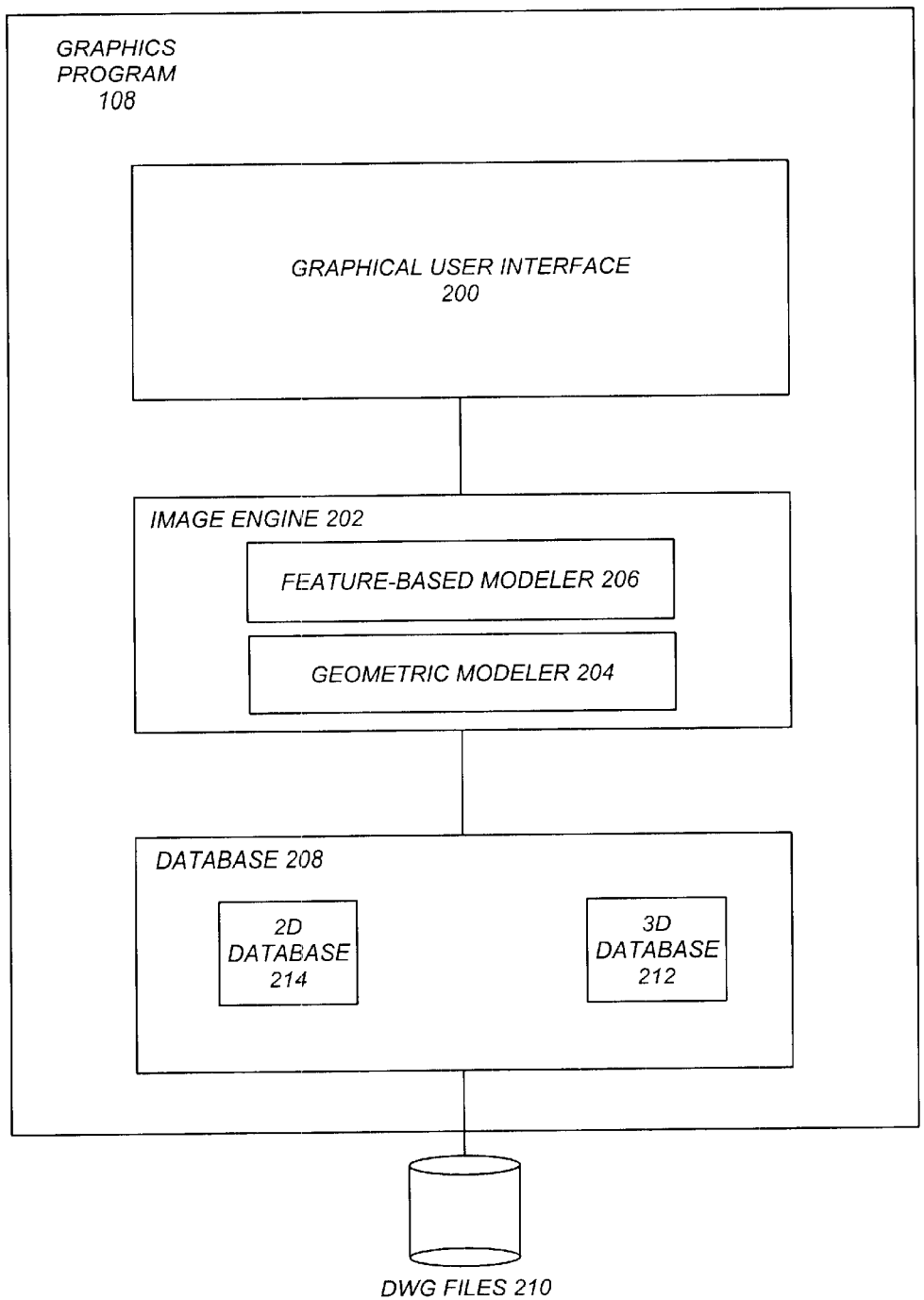
FIG. 2 is a block diagram that illustrates the components of the graphics program according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202 including a Geometric Modeler (GM) 204 and Feature-Based Modeler (FM) 206, and a database (DB) 208 for storing objects in Drawing (DWG) files 210.

The Graphical User Interface 200 displays information to the user and provides the functionality for the user's interaction with the graphics program 108.

The Image Engine 202 processes the Database 208 or DWG files 210 and delivers the resulting graphics to an output device. In the preferred embodiment, the Image Engine 202 provides a complete application programming interface (API) that allows other computer programs to interface to the graphics program 108 as needed.

The Geometric Modeler 204 primarily creates geometry and topology for models. The Feature-Based Modeler 206, which interacts with the Geometric Modeler 204, is a parametric feature-based solid modeler that integrates 2D and 3D mechanical design tools, including parametric assembly modeling, surface modeling, 2D design, and associative drafting. The Feature-Based Modeler 206 provides powerful solid-, surface-, and assembly-modeling functionality.

The Database 208 is comprised of two separate types of databases: (1) a 3D database 212 known as the "world space" that stores 3D information; and (2) one or more 2D databases 214 known as the "virtual spaces" or "view ports" that stores 2D information derived from the 3D information. The 3D database 212 captures the design intent and behavior of a component in a model.

Object Structure

Figure 3:
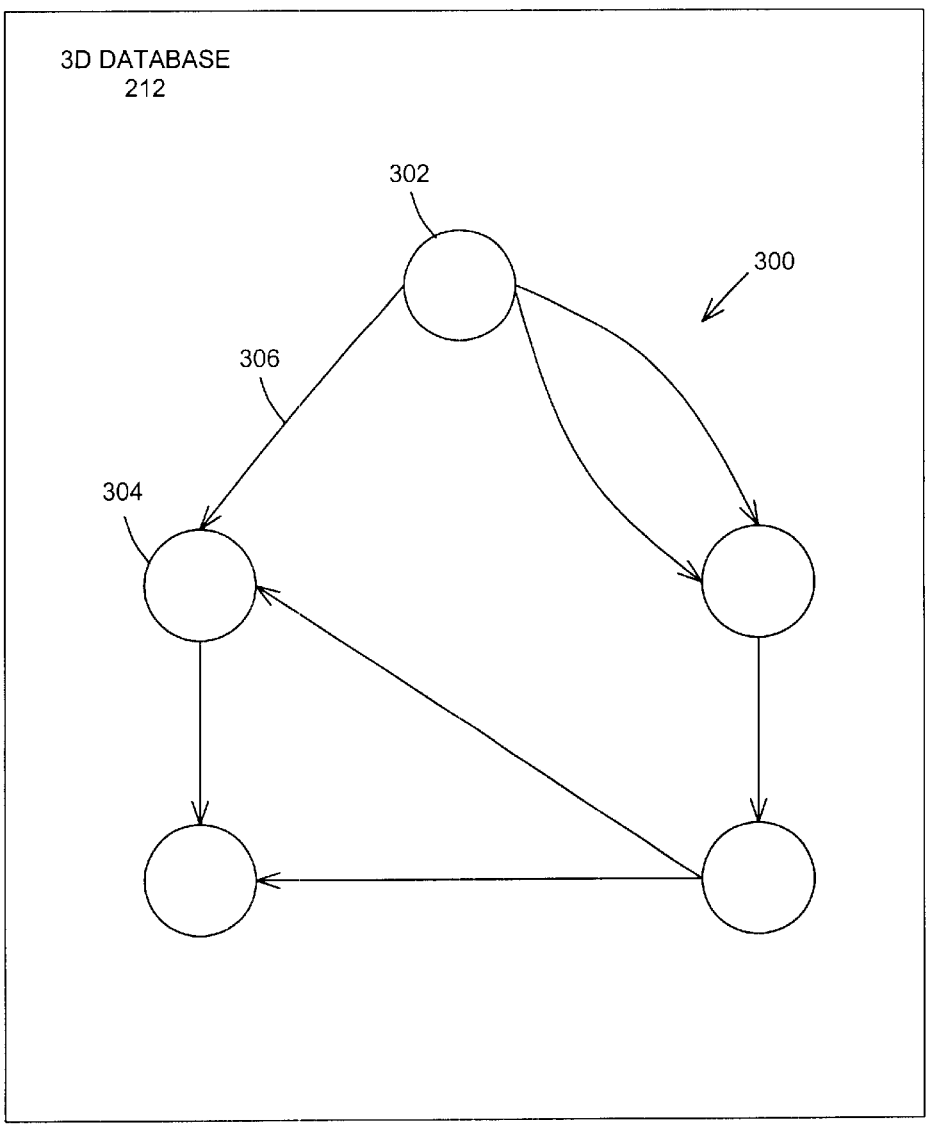
FIG. 3 is a block diagram that illustrates an object structure maintained by the 3D database according to the preferred embodiment of the present invention.

FIG. 3 is a block diagram that illustrates an object structure 300 maintained by the 3D database 212 according to the preferred embodiment of the present invention. Each object structure 300 includes a header node 302 and usually includes one or more nodes 304 connected by zero or more edges 306. There may be any number of different object structures 300 maintained by the 3D databases 212. Moreover, a node 304 may be a member of multiple structures 300 in the 3D databases 212.

Operation of the Preferred Embodiment

The preferred embodiment provides persistent naming for loft features in a parametric feature-based system, wherein the names are tolerant to partial topological changes. The preferred embodiment of the present invention accomplishes these results using two steps: generation of cross-section matrices and generation of face names.

Generation of Cross-Section Matrices

The symbols $\{X_1, X_2, X_3, \ldots, X_n\}$ are used to denote n ordered cross-sections in a loft feature. The cross-sections in the loft feature can occur as closed profiles, closed face loops, or points. In general, a cross-section X comprises a number of segments (lines, arcs, splines, etc.). If X has j segments, a unique persistent name (initial segment name), $S_i, S_{(i+1)}, \ldots, S_{(i+j)}$, is assigned to each segment from a base i.

During a section alignment process for the loft feature which, happens in the Geometric Modeler 204, the parent segments may be split by additional new vertices. This generates new segments (children) in the cross-sections. Whenever new segments are created, the Geometric Modeler 204 transfers the lofting attribute to the newly created segment from its parent. Based on this attribute, child segments are named as $(S_{i.1}, S_{i.2}, \ldots, S_{i+c})$, $(S_{(i+1).1}, S_{(i+1).2}, \ldots, S_{(i+1).c}) \ldots, S_{(i+j).c}$. The child's persistent name encapsulates two things: (1) its root, i.e., parent, segment name, and (2) an index c which denotes that it is the cth child. c denotes the number of splits happening during the section alignment and breakup in the Geometric Modeler 204. $S_{(i+j).c}$ in general will be represented as $S_{l.m}$, where l varies from 1 through j segments and m varies from 1 through the total number of splits that can happen on the lth segment.

Figure 4A:
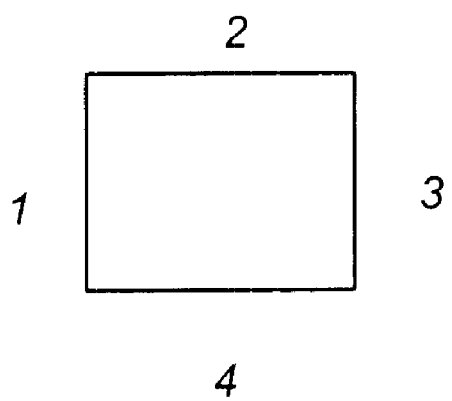
FIGS. 4A and 4B illustrate a cross-section and its segments before and after splitting according to the preferred embodiment of the present invention.
Figure 4B:
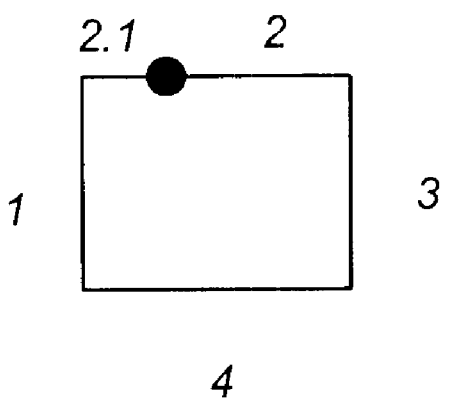

FIG. 4A shows a rectangular cross-section, its four parent segments, and their corresponding names, i.e., 1, 2, 3, 4. After section alignment and breakup, parent segment 2 of FIG. 4A is split, as shown in FIG. 4B, thus generating a new child. The child is given a name of 2.1. Additional children segment names of parent 2, if they exist, would be assigned names 2.2, 2.3, . . . , 2.n. The set of segment names that exist in the cross-section after naming the children comprises the final segment names as shown in FIG. 4B. These names are generated for all the cross-sections in the loft feature.

According to the preferred embodiment, $X_1S_{l,m}, X_2S_{l,m}, \ldots, X_nS_{l,m}$ are the final segment names generated for the segments in the n cross-sections. Initially, the number of segments in each of the n cross-sections are unequal. After the section alignment and break-up process, the number of segments, j, are the same in all the cross-sections. Thus, the j final segment names for a cross-section are a column of a matrix and when such j segment names for n cross-sections are laid side by side, they comprise a matrix of order (j×n). This matrix is known as the cross-section matrix. Each time a loft feature is computed, this transient cross-section matrix is generated. Hence, it is known as the generated cross-section matrix.

Generation of Face Names

A lateral face (LF) is created by the Geometric Modeler 204 taking one segment per cross-section and fitting a smooth surface through corresponding aligned segments on other cross-sections. These segments are known as generating segments. Thus, the number of lateral faces in a loft feature is equal to the number of final segment names (j) in any cross-section.

The persistent name for the lateral face is inferred from the collection of generating segments' segment names. These generating segment names can be represented as a unique and invariant n-tuple as $<X_1S_{l,m}, X_2S_{l,m}, \ldots, X_nS_{l,m}>$ cross-sections responsible for creating LF. This n-tuple is known as the generating n-tuple for a lateral face. During creation of the loft feature, the generating n-tuple in the generated cross-section matrix is used to generate a new persistent name for a lateral face.

In all other situations, such as editing the loft feature, lateral face names are either newly created or reused. A similarity analysis is performed, as discussed below, to find out if names need to be created or reused. Names are reused if Equation 1.1 below is satisfied:

$$<X_1S_{l,m}, X_2S_{l,m}, \ldots, X_nS_{l,m}> = <X'_1S_{l,m}, X'_2S_{l,m}, \ldots, X'_nS_{l,m}> \quad (1.1)$$

The condition for equality is that all the segment names $<X_1S_{l,m}, X_2S_{l,m}, X_nS_{l,m}>$ exist in $<X'_1S_{l,m}, X'_2S_{l,m}, \ldots, X'_nS_{l,m}>$ or vice versa. Thus, the order in which the segment names are compared is not important. X denotes the generating cross-sections, and X' denotes the existing cross-sections. For example, if a loft feature is created with two cross-sections, then those are considered to be existing cross-sections. During an edit, if one or more cross-sections are added to the loft feature, then there are three generating cross-sections in this situation.

$<X'_1S_{l,m}, X'_2S_{l,m}, \ldots, X'_nS_{l,m}>$ is referred to as the existing n-tuple. At creation time, Equation 1.1 will not be satisfied as X' does not exist. For subsequent updates on the loft feature, X' (existing cross-sections) exists and Equation 1.1 may be satisfied. If Equation 1.1 is satisfied, i.e., a match has occurred, then the existing lateral face name for the existing n-tuple $<X'_1S_{l,m}, X'_2S_{l,m}, \ldots, X'_nS_{l,m}>$ is assigned to the generated lateral face LF. If Equation 1.1 is not satisfied, i.e., no match was found, then a unique new lateral face name is created and assigned to LF.

The segment names of the generating n-tuple $<X_1S_{l,m}, X_2S_{l,m}, \ldots, X_nS_{l,m}>$ and the corresponding lateral face name are appended as a row to the existing cross-section matrix and the lateral face name matrix at the end. The lateral face name matrix is maintained separately from the cross-section matrix. This can be thought of as a column residing next to the cross-section matrix, which is always kept synchronized with the cross-section segment names. Its order is (1×j). Hence, for every n-tuple of segment names (rows in the cross-section matrix), there exists a corresponding row element in the lateral face name matrix.

After all the lateral faces have been processed, the existing cross-section matrix will contain matched and unmatched rows. Matched rows are retained and saved. Unmatched rows and their corresponding lateral face name entries are deleted. At all times, the number of rows in the cross-section matrix is equal to the number of rows in the lateral face name matrix.

A loft feature may also contain planar transverse faces, in addition to the lateral faces, in the plane of the start and end cross-sections. At creation time, the start and end cross-sections are used to infer the start and end transverse faces for naming purposes. So long as the start and end cross-sections exist at start or end positions, the names of the transverse faces are maintained the same. However, if start or end cross-section are deleted or moved to an intermediate location, then a fresh start or end is initialized for naming the transverse faces. By maintaining the same persistent name for transverse faces, other downstream features which reference these faces or its edges will be able to resolve their dependencies properly.

Figure 5A:
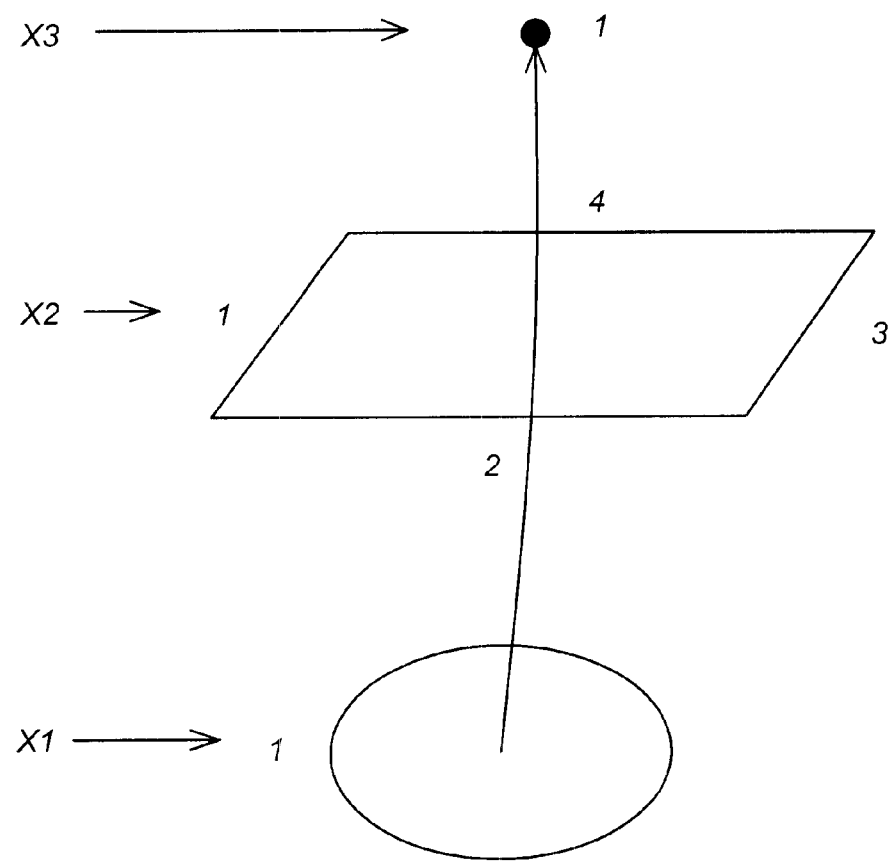
FIGS. 5A and 5B illustrate a loft feature created from an ordered set of three cross-sections according to the preferred embodiment of the present invention.
Figure 5B:
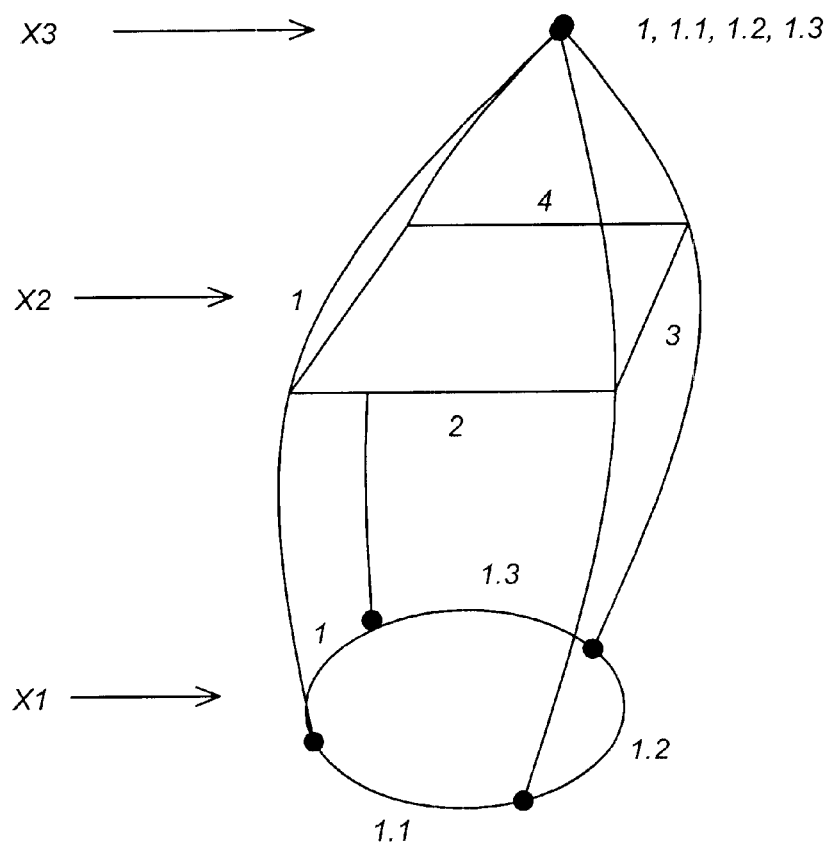

FIG. 5A shows an ordered set of three cross-sections, labeled as {X1, X2, X3}, used to create a loft feature. The initial segment names are shown next to the segments. As shown in FIG. 5B, during the section alignment process, X1 is split into 3 additional segments. Hence, its children are assigned names based on their parent, i.e., segment name 1, thereby resulting in names 1.1, 1.2 and 1.3. Observe that X2 is not split and its final segment names are the same as the initial segment names. X3, being a degenerate cross-section, is split for reasons of uniformity and to facilitate the creation of new lateral faces. The generated cross-section matrix is shown in Table 1 below:

TABLE 1

|  | $X_1$ | $X_2$ | $X_3$ | LATERAL FACE NAMES |
|---|---|---|---|---|
| Lateral Face 1 | 1 | 1 | 1 | 3 (NEW) |
| Lateral Face 2 | 1.1 | 2 | 1.1 | 4 (NEW) |
| Lateral Face 3 | 1.2 | 3 | 1.2 | 5 (NEW) |
| Lateral Face 4 | 1.3 | 4 | 1.3 | 6 (NEW) |

Figure 6:
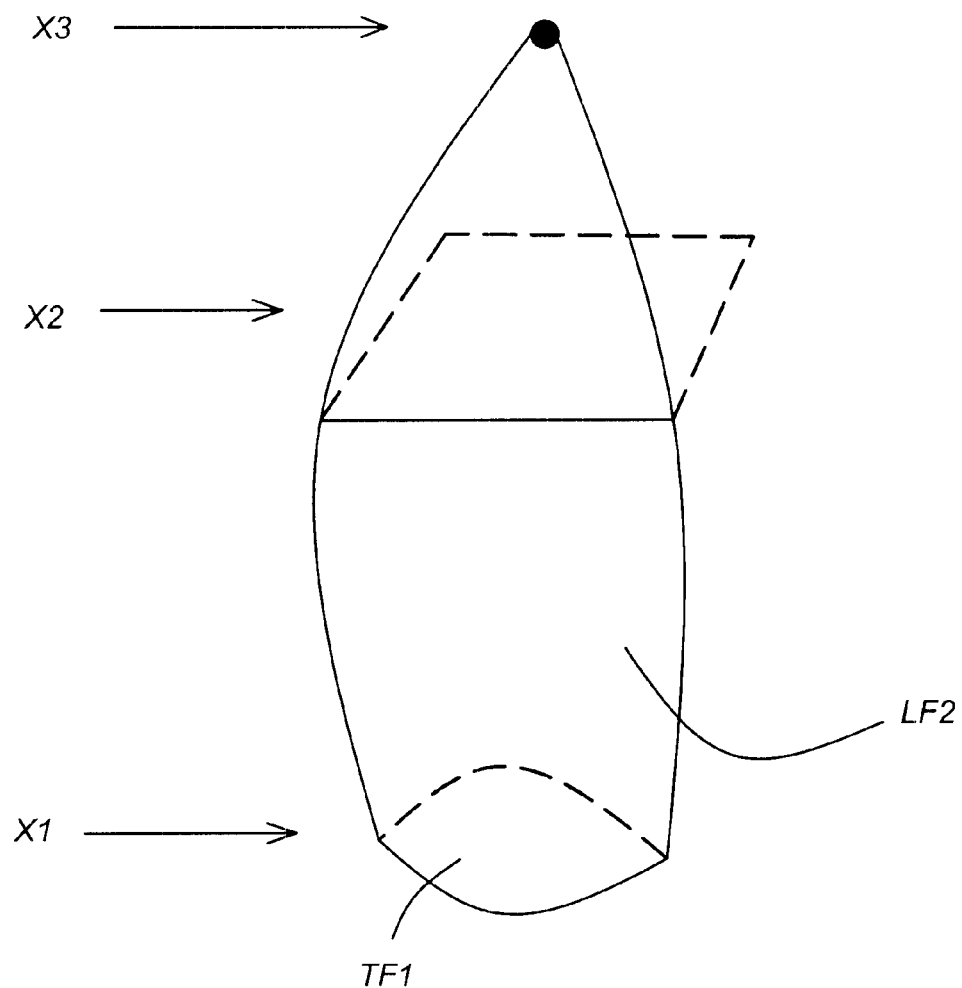
FIG. 6 illustrates a lateral face created for the loft feature shown in FIG. 5B according to the preferred embodiment of the present invention.

As the loft feature is being created the first time, the condition shown in Equation 1.1 will be not satisfied for any lateral face. The four lateral faces created by the loft feature are named based on the generation of new names <3,4,5,6> shown as lateral faces names in Table 1. Hence, the generated cross-section matrix becomes the existing cross-section matrix persistent). The lateral face name matrix is also shown in Table 1. A row element in the cross-section matrix shown in Table 1 means that: Lateral face 2 (row 3) shown in FIG. 6 is generated by the 3-tuple <1.1, 2, 1.1>. This 3-tuple created the lateral face name 4. A single transverse face ($TF_1$) is created in the plane of the start cross-section, which is named as 1. If a transverse face had existed in the plane of the end cross-section, it is named as 2. These names are also preserved under subsequent modifications. Thus, for example, in Table 1, if the loft feature is edited so that the new order of lofting is {X3, X2, X1}, then the names of the transverse faces will still be maintained.

Editing Operations

Consider the following editing operations on the loft feature shown in FIG. 5B, which illustrates that the naming scheme is tolerant to partial topological changes during editing:

1. Delete cross-section X3.
2. Reorder the loft feature, so that the current order of lofting is {X2, X1}.

Figure 7A:
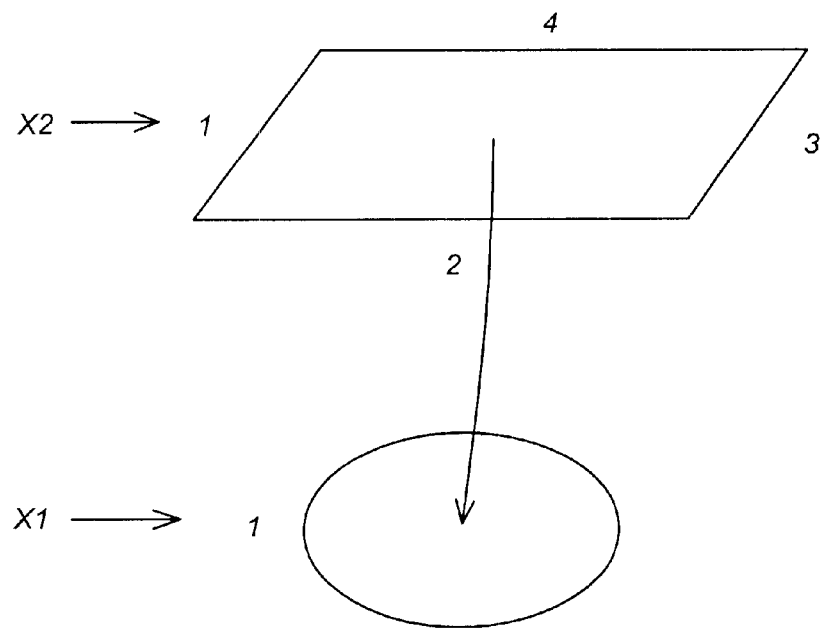
FIGS. 7A and 7B illustrate a editing operation on the loft feature in FIG. 5B with an ordered set of two cross-sections according to the preferred embodiment of the present invention.
Figure 7B:
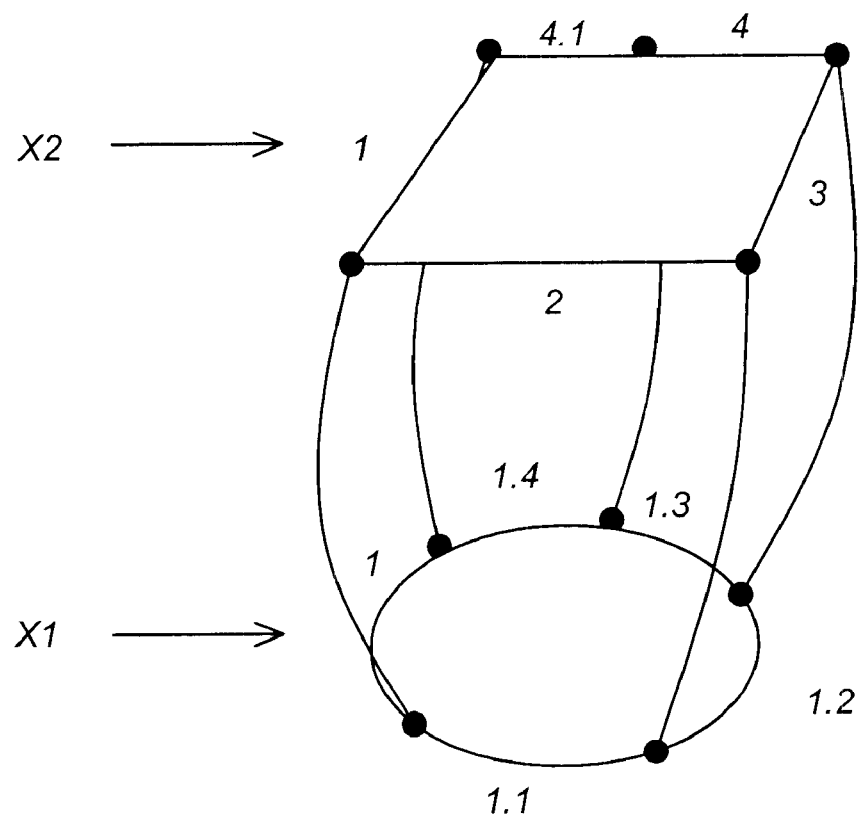

FIGS. 7A and 7B illustrate the new edited loft feature created from an ordered set of two cross-sections according to the preferred embodiment of the present invention. Specifically, FIGS. 7A and 7B shows the result of the editing operations before the update. When the model is updated, the cross-section matrix is then generated. A similarity analysis is performed on the generated (transient) and existing cross-section (persistent) matrices. The existing cross-section matrix would be as shown in Table 2 below, with the exception of X3's column (this column will be deleted during update, as X3 is deleted).

TABLE 2

|  | $X_1$ | $X_2$ | $X_1'$ | $X_2'$ | EXISTING LATERAL FACE NAMES | NEW LATERAL FACE NAMES |
| --- | --- | --- | --- | --- | --- | --- |
| Lateral Face 1 | 1 | 1 | 1 | 1 | 3 (NEW) | 3 (OLD) |
| Lateral Face 2 | 1.1 | 2 | 1.1 | 2 | 4 (NEW) | 4 (OLD) |
| Lateral Face 3 | 1.2 | 3 | 1.2 | 3 | 5 (NEW) | 5 (OLD) |
| Lateral Face 4 | 1.3 | 4 | 1.3 | 4 | 6 (NEW) | 6 (OLD) |
| Lateral Face 5 | 1.4 | 4.1 |  |  |  | 7 (NEW) |

For convenience, the columns of the existing and generating cross-section matrices in Table 2 are shown next to each other. For Lateral Faces 1, 2, 3, and 4 in Table 2, <X1, X2>===<X1', X2'>. Hence, their corresponding lateral face names (the last column in Table 2) do not change as an exact match has occurred. Lateral Face 5's segment names <1.4,4.1> do not match with any rows in the existing cross-section matrix. Hence, a new lateral face name is generated: 7 for Lateral Face 5 (the last row in Table 2). This is followed by updating the cross-section and the lateral face name matrices. Since all the rows of the existing cross-section matrix in Table 1 were matched with rows in Table 2, no rows are deleted from the existing cross-section matrix.

This example shows that when a loft feature that has four lateral faces is modified to generate five lateral faces, it retains the names of four of its lateral faces and one transverse face, thus preserving some old names from update to update. Moreover, other features referencing the old names will resolve properly. This process continues from update to update and thus the system ensures that the names of the faces generated by the lofting do not change from one editing operation to the other, as long as the system determines that the generating n-tuple is equal to the existing n-tuple.

Logic of the Graphics Program

Figure 8:
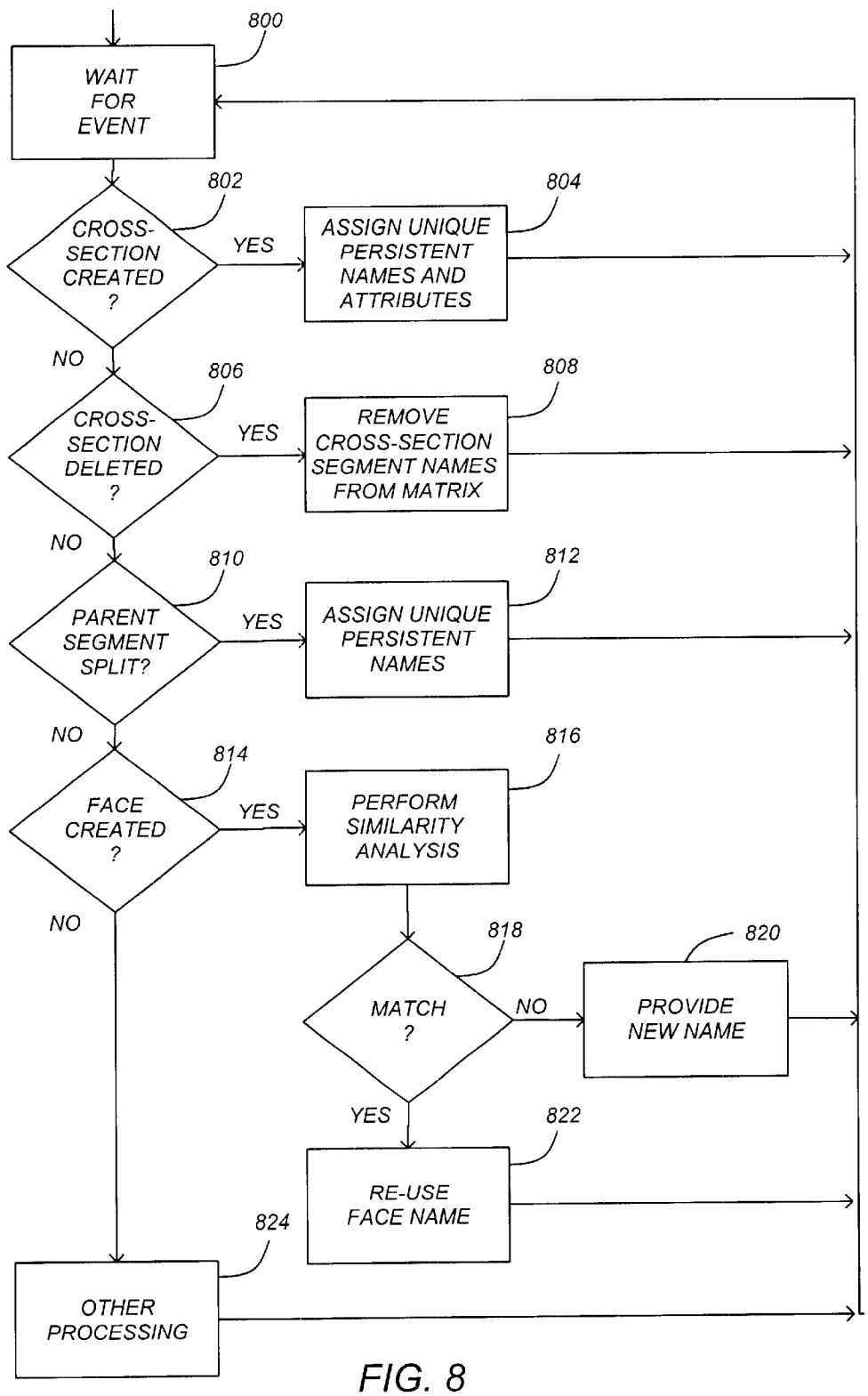
FIG. 8 is a flowchart that illustrates the general logic performed according to the preferred embodiment of the present invention.

FIG. 8 is a flowchart that illustrates the general logic performed according to the preferred embodiment of the present invention. Those skilled in the art will recognize that this logic is provided for illustrative purposes only and that different logic may be used to accomplish the same results.

Block 800 represents the graphics program 108 waiting for a next event to occur. Thereafter, control transfers to Blocks 802–824 to process the events.

Block 802 is a decision block that determines whether a cross-section was created for a loft feature. If so, control transfers to Block 804; otherwise, control transfers to Block 806.

Block 804 represents the graphics program 108 assigning a unique persistent name to each segment, according to $S_i$, $S_{(i+1)}, \ldots, S_{(i+j)}$, wherein i is its parent segment's name and j is the number of segments in the cross-section.

Block 806 is a decision block that determines whether a cross-section of a loft feature was deleted or reordered. If so, control transfers to Block 808; otherwise, control transfers to Block 810.

Block 808 represents the graphics program 108 removing the segment names column from the cross-section matrix.

Block 810 is a decision block that determines whether a parent segment for a cross-section of a loft feature was split. If so, control transfers to Block 812; otherwise, control transfers to Block 814.

Block 812 represents the graphics program 108 assigning unique persistent names to each new child segment, according to as $(S_{i.1}, S_{i.2}, \ldots, S_{i.c})$, $(S_{(i+1).1}, S_{(i+1).2}, \ldots, S_{(i+1).c}) \ldots, S_{(i+j).c}$, wherein i is its parent segment's name and j is the number of segments in a cross-section.

Block 814 is a decision block that determines whether a lateral or transverse face was created for a loft feature. If so, control transfers to Block 816; otherwise, control transfers to Block 824.

Block 816 represents the graphics program 108 performing a similarity analysis generating a unique persistent name for the lateral or transverse face from the unique and invariant n-tuple $<X_1 S_{l.m}, X_2 S_{l.m}, \ldots, X_n S_{l.m}>$ responsible for creating the lateral or transverse face.

Block 818 is a decision block that determines whether or not a match occurred during the similarity analysis. If so, control transfers to Block 820; otherwise, control transfers to Block 822.

Block 820 represents the graphics program 108 reusing the existing name for a lateral or a transverse face, if a match occurred in the similarity analysis.

Block 822 represents the graphics program 108 generating a new name for a lateral or transverse face, if a match did not occur in the similarity analysis.

Finally, Block 824 represents the graphics program 108 performing other processing.

Conclusion

This concludes the description of the preferred embodiment of the invention. The following describes some alternative embodiments for accomplishing the present invention. For example, any type of computer, such as a mainframe, minicomputer, work station or personal computer, could be used with the present invention. In addition, any program, function, or system providing loft features in a graphical imaging environment could benefit from the present invention.

In summary, the present invention discloses a computer-implemented method, apparatus, and article of manufacture for generating tolerant, persistent and unique names for topological entities of a loft feature in a computer-implemented, parametric feature-based, solid modeling system. Names are preserved and updated in such a manner that they are tolerant to partial topology changes in the loft feature. Thus, persistent naming for a loft feature in a parametric feature-based system can be made tolerant to partial topological changes, by the creation, similarity analysis and update of cross-section matrices.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented graphics system, comprising:
   (a) a computer having an output device coupled thereto;
   (b) a database for storing a representation of a three-dimensional (3D) graphical image, wherein the 3D graphical image includes at least one loft feature; and
   (c) an image engine for processing the 3D graphical image stored in the database and for delivering the processed 3D graphical image to the output device, wherein the image engine includes a feature-based modeler for processing a loft feature in the graphical image, the loft feature is generated from one or more ordered cross-sections, each of the cross-sections is comprised of one or more segments, each of the segments is assigned a unique persistent name, one or more cross-section matrices are created for the unique persistent names of the segments, and the unique persistent names of the segments are made tolerant to partial topological changes of the loft feature by similarity analysis and update of the cross-section matrices.

2. The system of claim 1, wherein the feature-based modeler further comprises means for preserving the unique persistent names during editing of the loft feature.

3. The system of claim 1, wherein the feature-based modeler further comprises means for preserving the unique persistent names when the cross-sections are deleted.

4. The system of claim 1, wherein the feature-based modeler further comprises means for preserving the unique persistent names when the cross-sections are reordered.

5. The system of claim 4, wherein the unique persistent name of the segment encapsulates an index k that denotes it is the kth segment of the cross-section.

6. The system of claim 5, wherein the segments are parent segments, at least one of the parent segments is split to create one or more child segments, and each of the child segments is assigned a unique persistent name based on the unique persistent name of the parent segment.

7. The system of claim 6, wherein the unique persistent name of the child segment encapsulates its parent segment's unique persistent name and an index j that denotes it is the jth child segment of the parent segment.

8. The system of claim 7, wherein a set of the unique persistent names of the segments that exist in the cross-section after naming the child segments comprises final segment names.

9. The system of claim 1, wherein the feature-based modeler further comprises means for generating the cross-section matrix each time the loft feature is computed.

10. The system of claim 1, wherein the loft feature comprises one or more faces generated from one or more of the cross-sections, and each of the faces is assigned a unique persistent name.

11. The system of claim 10, wherein the feature-based modeler further comprises means for generating the unique persistent names for the faces each time the loft feature is computed.

12. The system of claim 10, wherein the feature-based modeler further comprises means for generating a cross-section matrix for the unique persistent names of the faces of the loft feature.

13. The system of claim 12, wherein the feature-based modeler further comprises means for generating the cross-section matrix each time the loft feature is computed.

14. The system of claim 10, wherein the feature-based modeler further comprises means for using a face generated by fitting a surface through a plurality of generating segments of one or more of the cross-sections, and for generating a unique persistent name for the face from a plurality of unique persistent names for the generating segments.

15. The system of claim 14, wherein the unique persistent names for the generating segments are represented as an n-tuple $<X_1 S_{l,m}, X_2 S_{l,m}, \ldots, X_n S_{l,m}>$ responsible for creating the face, where l varies from 1 through j segments of a cross-section X, m varies from 1 through a total number of split segments on an lth segment of the cross-section X, and n varies from 1 through a total number of cross-sections.

16. The system of claim 15, wherein the unique persistent name for the face is reused when:

$$<X_1 S_{l,m}, X_2 S_{l,m}, \ldots, X_n S_{l,m}> = <X'_1 S_{l,m}, X'_2 S_{l,m}, \ldots, X'_n S_{l,m}>$$

wherein X denotes the generating cross-sections and X' denotes the existing cross-sections, so that all the unique persistent names of the segments in $<X_1 S_{l,m}, X_2 S_{l,m}, \ldots, X_n S_{l,m}>$ exist in $<X'_1 S_{l,m}, X'_2 S_{l,m}, \ldots, X'_n S_{l,m}>$ or all the unique persistent names of the segments in $<X'_1 S_{l,m}, X'_2 S_{l,m}, \ldots, X'_n S_{l,m}>$ exist in $<X_1 S_{l,m}, X_2 S_{l,m}, \ldots, X_n S_{l,m}>$.

17. The system of claim 16, wherein the unique persistent name for the face is not reused and a new unique persistent name is created when:

$$<X_1 S_{l,m}, X_2 S_{l,m}, \ldots, X_n S_{l,m}> != <X'_1 S_{l,m}, X'_2 S_{l,m}, \ldots, X'_n S_{l,m}>$$

wherein X denotes the generating cross-sections and X' denotes the existing cross-sections, so that all the unique persistent names of the segments in $<X_1 S_{l,m}, X_2 S_{l,m}, \ldots, X_n S_{l,m}>$ do not exist in $<X'_1 S_{l,m}, X'_2 S_{l,m}, \ldots, X'_n S_{l,m}>$ or all the unique persistent names of the segments in $<X'_1 S_{l,m}, X'_2 S_{l,m}, \ldots, X'_n S_{l,m}>$ do not exist in $<X_1 S_{l,m}, X_2 S_{l,m}, \ldots, X_n S_{l,m}>$.

18. A computer-implemented method of processing three-dimensional (3D) graphical images, comprising:
   (a) storing a representation of a three-dimensional (3D) graphical image in a database, wherein the 3D graphical image includes at least one loft feature; and
   (b) processing the 3D graphical image stored in the database and delivering the processed 3D graphical image to an output device, wherein the image engine includes a feature-based modeler for processing a loft feature in the graphical image, the loft feature is generated from one or more ordered cross-sections, each of the cross-sections is comprised of one or more segments, each of the segments is assigned a unique persistent name, one or more cross-section matrices are created for the unique persistent names of the segments, and the unique persistent names of the segments are made tolerant to partial topological changes of the loft feature by similarity analysis and update of the cross-section matrices.

19. The method of claim 18, wherein the processing step further comprises the step of preserving the unique persistent names during editing of the loft feature.

20. The method of claim 18, wherein the processing step further comprises the step of preserving the unique persistent names when the cross-sections are deleted.

21. The method of claim 18, wherein the processing step further comprises the step of preserving the unique persistent names when the cross-sections are reordered.

22. The method of claim 21, wherein the unique persistent name of the segment encapsulates an index k that denotes it is the kth segment of the cross-section.

23. The method of claim 22, wherein the segments are parent segments, at least one of the parent segments is split to create one or more child segments, and each of the child segments is assigned a unique persistent name based on the unique persistent name of the parent segment.

24. The method of claim 23, wherein the unique persistent name of the child segment encapsulates its parent segment's unique persistent name and an index j that denotes it is the jth child segment of the parent segment.

25. The method of claim 24, wherein a set of the unique persistent names of the segments that exist in the cross-section after naming the child segments comprises final segment names.

26. The method of claim 18, wherein the processing step further comprises the step of generating the cross-section matrix each time the loft feature is computed.

27. The method of claim 18, wherein the loft feature comprises one or more faces generated from one or more of the cross-sections, and each of the faces is assigned a unique persistent name.

28. The method of claim 27, wherein the processing step further comprises the step of generating the unique persistent names for the faces each time the loft feature is computed.

29. The method of claim 27, wherein the processing step further comprises the step of generating a cross-section matrix for the unique persistent names of the faces of the loft feature.

30. The method of claim 29, wherein the processing step further comprises the step of generating the cross-section matrix each time the loft feature is computed.

31. The method of claim 27, wherein the processing step further comprises the step of using a face generated by fitting a surface through a plurality of generating segments of one or more of the cross-sections, and for generating a unique persistent name for the face from a plurality of unique persistent names for the generating segments.

32. The method of claim 31, wherein the unique persistent names for the generating segments are represented as an n-tuple $<X_1 S_{l,m}, X_2 S_{l,m}, \ldots, X_n S_{l,m}>$ responsible for creating the face, where l varies from 1 through j segments of a cross-section X, m varies from 1 through a total number of split segments on an lth segment of the cross-section X, and n varies from 1 through a total number of cross-sections.

33. The method of claim 32, wherein the unique persistent name for the face is reused when:

$$<X_1 S_{l,m}, X_2 S_{l,m}, \ldots, X_n S_{l,m}> = <X'_1 S_{l,m}, X'_2 S_{l,m}, \ldots, X'_n S_{l,m}>$$

wherein X denotes the generating cross-sections and X' denotes the existing cross-sections, so that all the unique persistent names of the segments in $<X_1 S_{l,m}, X_2 S_{l,m}, \ldots, X_n S_{l,m}>$ exist in $<X'_1 S_{l,m}, X'_2 S_{l,m}, \ldots, X'_n S_{l,m}>$ or all the unique persistent names of the segments in $<X'_1 S_{l,m}, X'_2 S_{l,m}, \ldots, X'_n S_{l,m}>$ exist in $<X_1 S_{l,m}, X_2 S_{l,m}, \ldots, X_n S_{l,m}>$.

34. The method of claim 33, wherein the unique persistent name for the face is not reused and a new unique persistent name is created when:

$$<X_1 S_{l,m}, X_2 S_{l,m}, \ldots, X_n S_{l,m}> != <X'_1 S_{l,m}, X'_2 S_{l,m}, \ldots, X'_n S_{l,m}>$$

wherein X denotes the generating cross-sections and X' denotes the existing cross-sections, so that all the unique persistent names of the segments in $<X_1 S_{l,m}, X_2 S_{l,m}, \ldots, X_n S_{l,m}>$ do not exist in $<X'_1 S_{l,m}, X'_2 S_{l,m}, \ldots, X'_n S_{l,m}>$ or all the unique persistent names of the segments in $<X'_1 S_{l,m}, X'_2 S_{l,m}, \ldots, X'_n S_{l,m}>$ do not exist in $<X_1 S_{l,m}, X_2 S_{l,m}, \ldots, X_n S_{l,m}>$.

35. An article of manufacture embodying logic for performing a computer-implemented method of processing three-dimensional (3D) graphical images, the method comprising:

(a) storing a representation of a three-dimensional (3D) graphical image in a database, wherein the 3D graphical image includes at least one loft feature; and (b) processing the 3D graphical image stored in the database and delivering the processed 3D graphical image to an output device, wherein the image engine includes a feature-based modeler for processing a loft feature in the graphical image, the loft feature is generated from one or more ordered cross-sections, each of the cross-sections is comprised of one or more segments, each of the segments is assigned a unique persistent name, one or more cross-section matrices are created for the unique persistent names of the segments, and the unique persistent names of the segments are made tolerant to partial topological changes of the loft feature by similarity analysis and update of the cross-section matrices.

36. The method of claim 35, wherein the processing step further comprises the step of preserving the unique persistent names during editing of the loft feature.

37. The method of claim 35, wherein the processing step further comprises the step of preserving the unique persistent names when the cross-sections are deleted.

38. The method of claim 35, wherein the processing step further comprises the step of preserving the unique persistent names when the cross-sections are reordered.

39. The method of claim 38, wherein the unique persistent name of the segment encapsulates an index k that denotes it is the kth segment of the cross-section.

40. The method of claim 39, wherein the segments are parent segments, at least one of the parent segments is split to create one or more child segments, and each of the child segments is assigned a unique persistent name based on the unique persistent name of the parent segment.

41. The method of claim 40, wherein the unique persistent name of the child segment encapsulates its parent segment's unique persistent name and an index j that denotes it is the jth child segment of the parent segment.

42. The method of claim 41, wherein a set of the unique persistent names of the segments that exist in the cross-section after naming the child segments comprises final segment names.

43. The method of claim 35, wherein the processing step further comprises the step of generating the cross-section matrix each time the loft feature is computed.

44. The method of claim 35, wherein the loft feature comprises one or more faces generated from one or more of the cross-sections, and each of the faces is assigned a unique persistent name.

45. The method of claim 44, wherein the processing step further comprises the step of generating the unique persistent names for the faces each time the loft feature is computed.

46. The method of claim 44, wherein the processing step further comprises the step of generating a cross-section matrix for the unique persistent names of the faces of the loft feature.

47. The method of claim 46, wherein the processing step further comprises the step of generating the cross-section matrix each time the loft feature is computed.

48. The method of claim 44, wherein the processing step further comprises the step of using a face generated by fitting a surface through a plurality of generating segments of one or more of the cross-sections, and for generating a unique persistent name for the face from a plurality of unique persistent names for the generating segments.

49. The method of claim 48, wherein the unique persistent names for the generating segments are represented as an n-tuple $\langle X_1 S_{l,m}, X_2 S_{l,m}, \ldots, X_n S_{l,m}\rangle$ responsible for creating the face, where l varies from 1 through j segments of a cross-section X, m varies from 1 through a total number of split segments on an lth segment of the cross-section X, and n varies from 1 through a total number of cross-sections.

50. The method of claim 49, wherein the unique persistent name for the face is reused when:

$$\langle X_1 S_{l,m}, X_2 S_{l,m}, \ldots, X_n S_{l,m}\rangle = \langle X'_1 S_{l,m}, X'_2 S_{l,m}, \ldots, X'_n S_{l,m}\rangle$$

wherein X denotes the generating cross-sections and X' denotes the existing cross-sections, so that all the unique persistent names of the segments in $\langle X_1 S_{l,m}, X_2 S_{l,m}, \ldots, X_n S_{l,m}\rangle$ exist in $\langle X'_1 S_{l,m}, X'_2 S_{l,m}, \ldots, X'_n S_{l,m}\rangle$ or all the unique persistent names of the segments in $\langle X'_1 S_{l,m}, X'_2 S_{l,m}, \ldots, X'_n S_{l,m}\rangle$ exist in $\langle X_1 S_{l,m}, X_2 S_{l,m}, \ldots, X_n S_{l,m}\rangle$.

51. The method of claim 50, wherein the unique persistent name for the face is not reused and a new unique persistent name is created when:

$$\langle X_1 S_{l,m}, X_2 S_{l,m}, \ldots, X_n S_{l,m}\rangle != \langle X'_1 S_{l,m}, X'_2 S_{l,m}, \ldots, X'_n S_{l,m}\rangle$$

wherein X denotes the generating cross-sections and X' denotes the existing cross-sections, so that all the unique persistent names of the segments in $\langle X_1 S_{l,m}, X_2 S_{l,m}, \ldots, X_n S_{l,m}\rangle$ do not exist in $\langle X'_1 S_{l,m}, X'_2 S_{l,m}, \ldots, X'_n S_{l,m}\rangle$ or all the unique persistent names of the segments in $\langle X'_1 S_{l,m}, X'_2 S_{l,m}, \ldots, X'_n S_{l,m}\rangle$ do not exist in $\langle X_1 S_{l,m}, X_2 S_{l,m}, \ldots, X_n S_{l,m}\rangle$.

* * * * *